United States Patent
Limbaugh et al.

(10) Patent No.: US 9,621,258 B2
(45) Date of Patent: Apr. 11, 2017

(54) BI-DIRECTIONAL COMMUNICATION FOR CONTROL OF UNMANNED SYSTEMS

(71) Applicant: Kutta Technologies, Inc., Phoenix, AZ (US)

(72) Inventors: Douglas V. Limbaugh, Phoenix, AZ (US); David Howard Barnhard, Lilburn, GA (US); Geoffrey David Simms, Phoenix, AZ (US)

(73) Assignee: Kutta Technologies, Inc., Phoenix, AZ (US)

( * ) Notice: Subject to any disclaimer, the term of this patent is extended or adjusted under 35 U.S.C. 154(b) by 128 days.

(21) Appl. No.: 14/632,708

(22) Filed: Feb. 26, 2015

(65) Prior Publication Data

US 2016/0080539 A1    Mar. 17, 2016

Related U.S. Application Data

(60) Provisional application No. 61/944,935, filed on Feb. 26, 2014.

(51) Int. Cl.
| | |
|---|---|
| H04M 3/00 | (2006.01) |
| H04B 7/26 | (2006.01) |
| G08C 17/02 | (2006.01) |

(52) U.S. Cl.
CPC ............ *H04B 7/26* (2013.01); *G08C 17/02* (2013.01)

(58) Field of Classification Search
CPC ........ H04M 1/7253; H04B 7/26; G08C 17/02
USPC ................................. 455/420, 66.1
See application file for complete search history.

(56) References Cited

U.S. PATENT DOCUMENTS

| | | | | |
|---|---|---|---|---|
| 5,716,032 A | * | 2/1998 | McIngvale | B64C 39/024 244/185 |
| 6,119,976 A | * | 9/2000 | Rogers | B64C 39/024 244/13 |
| 6,176,451 B1 | * | 1/2001 | Drymon | F41G 7/306 244/158.1 |
| 7,542,828 B2 | * | 6/2009 | Steele | B64C 39/024 244/190 |
| 7,693,624 B2 | * | 4/2010 | Duggan | G05D 1/0061 244/75.1 |
| 8,019,447 B2 | * | 9/2011 | Hoisington | G05D 1/0044 700/31 |
| 8,145,199 B2 | * | 3/2012 | Tadayon | H04B 5/0062 455/418 |
| 8,213,957 B2 | * | 7/2012 | Bull | G01S 5/02 370/328 |
| 8,433,467 B2 | * | 4/2013 | Ross-Martin | G05D 1/0234 701/23 |
| 8,433,469 B2 | * | 4/2013 | Harvey | G05D 1/0221 187/237 |
| 8,442,709 B2 | * | 5/2013 | Larkin | G05D 1/0692 114/312 |

(Continued)

*Primary Examiner* — Marceau Milord
(74) *Attorney, Agent, or Firm* — Kirby B. Drake; Klemchuk LLP

(57) ABSTRACT

Bi-directional personal communication systems and processes may be utilized to control unmanned systems. Such systems and processes may enable operator interface with unmanned systems as a replacement or a supplement to use of specialized hardware and rich, graphical interfaces. The bi-directional communication systems and methods also may be integrated as a subsystem within a ground control station. The system may include a personal communications device with a native interface for an operator to select command, control and/or communication (C3) messages to interact with the unmanned system, and a communication link operable to send the C3 messages selected by the operator to the unmanned system, wherein the unmanned system includes a receiver that receives the C3 messages over the communication link and an onboard computing device that processes and responds to the C3 messages received by the receiver.

26 Claims, 7 Drawing Sheets

(56) References Cited

U.S. PATENT DOCUMENTS

| | | | | |
|---|---|---|---|---|
| 8,478,455 B2* | 7/2013 | Orsulak | ............... | G05D 1/0011 701/2 |
| 8,630,820 B2* | 1/2014 | Amis | ..................... | G01S 19/16 455/404.1 |
| 8,818,705 B2* | 8/2014 | Spata | ..................... | G01W 1/00 701/10 |
| 9,405,005 B1* | 8/2016 | Arteaga | ................. | G01S 13/91 |
| 2007/0244608 A1* | 10/2007 | Rath | .................... | G05D 1/0038 701/3 |
| 2008/0071431 A1* | 3/2008 | Dockter | ................. | B63B 35/50 701/3 |
| 2010/0118147 A1* | 5/2010 | Dorneich | ............... | H04N 7/185 348/155 |
| 2010/0228418 A1* | 9/2010 | Whitlow | ............. | G11B 27/105 701/25 |
| 2010/0286859 A1* | 11/2010 | Feigh | .................. | G05D 1/0044 701/25 |
| 2011/0184590 A1* | 7/2011 | Duggan | ............... | G05D 1/0061 701/2 |
| 2014/0074339 A1* | 3/2014 | Casado | ............... | G05D 1/0088 701/24 |
| 2015/0192928 A1* | 7/2015 | Sastre I Sastre | ...... | G01C 11/02 701/25 |

\* cited by examiner

BI-DIRECTIONAL COMMUNICATION FOR CONTROL OF UNMANNED SYSTEMS

CROSS-REFERENCE TO RELATED APPLICATION

This application claims priority to U.S. Patent Application Ser. No. 61/944,935 filed on Feb. 26, 2014, entitled "Bi-Directional Communication for Control of Unmanned Systems," which is incorporated by reference in its entirety.

GOVERNMENT LICENSE RIGHTS

This invention was made with government support under Contract No. W81XWH-13-C-0110C awarded by the United States Army. The government has certain rights in the invention.

TECHNICAL FIELD

The present disclosure relates to bi-directional communication for control of unmanned systems, and more particularly to bi-directional communication systems and methods for interacting with and controlling the operation of an unmanned system.

BACKGROUND

Current technologies that operators use to interact with unmanned systems are typically based on the operator using an interface device such as a computer or a computing device that permits rich, graphics-based interfaces with the unmanned system or systems. This graphical interface often includes maps and icon based representations of the locations of unmanned systems along with other mission-related graphical representations. These systems are generally referred to as ground control stations (GCS) or ground data terminals (GDT). These systems may also be found in the air within a cockpit or mission station, at sea, or onboard a submarine. The conventional GCS or GDT may further be worn on a wrist, located on a Smartphone or housed on a larger computer system in the back of a vehicle or commands center.

These interface devices are typically part of, or connected to, a single purpose communication transceiver, which comprises one side of a two-way communication link with the unmanned system. These special-purpose communication transceivers, as well as the associated devices and interfaces are often designed and built by the unmanned system manufacturer. The exclusive binding of command, control and/or communications (C3) for unmanned systems to special-purpose devices and systems limits the possible interactions with unmanned systems and therefore limits their use in ad-hoc or emergent situations. Such situations may include safety-critical and/or commercially valuable unmanned missions, such as a rescue operation where a person near a potential landing site for an unmanned air ambulance could supply valuable information for the unmanned vehicle to enable a safe landing, or a package-delivery scenario where a package recipient can be notified of an incoming delivery and give acknowledgments and authorization to complete the delivery. Another scenario may include a person who may not have access to the GCS or GDT who may require that an unmanned system change the state of some on-board actuator or sensor, and may require that the resulting state information or sensor data be relayed back to the person directly instead of requiring the involvement of the GCS or GDT. In all of these examples, the unmanned system may be dispatched by a conventional GCS or GDT, but would require supplemental communication with another party unrelated to the GCS or GDT to complete its mission. None of these scenarios is possible so long as special-purpose hardware devices control unmanned systems.

SUMMARY

Embodiments of the present disclosure may provide a communication system for interacting with an unmanned system comprising a personal communication device using its native interface for an operator to select command, control and/or communication (C3) messages to interact with the unmanned system, the C3 messages selected from the group comprising: determine status of the unmanned system, prescribe desired actions for the unmanned system, change the current mission of the unmanned system, and change the state of the unmanned system, and a communication link operable to send the C3 messages selected by the operator to the unmanned system, wherein the unmanned system may include a compatible communication device that receives the C3 messages over the communication link and a processor that processes and responds to the C3 messages received by the receiver. The operator may be ground-based, sea-based, underwater-based, or air-based. The native interface may be selected from the group comprising: a virtual interface, a physical interface, a generated interface, an augmented reality interface, a voice controlled interface, and combinations thereof. The communication link may be selected from the group comprising: audio, visual, point-to-point radio, infrastructure radio such as a cellular network, optical, DTMF tone, digital message, Wi-Fi, CDMA, GSM, LTE, WiMAX, Internet Protocol (IP) link, other digital packet network link, microwave, and combinations thereof. The unmanned system may contain hardware to support communication on any of these link media. The unmanned system may respond to the C3 messages by adjusting, reacting, changing, altering or maintaining its current status, location, position, task or other unmanned system activity. The unmanned system may respond to the operator through use of pre-recorded voice messages. The unmanned system may respond to the operator through use of a text-to-speech engine. The unmanned system may respond to the operator through use of a digital message to be displayed on a screen. The unmanned system may respond to the operator through the use of digital text. The unmanned system may respond to the operator through the use of other digital information formatted for the native interface of the personal communication device. The communication system may be a supplement to a ground control station or ground data terminal. It also may replace a ground control station or ground data terminal, or it may be integrated as a subsystem within a ground control station or ground data terminal.

Other embodiments of the present disclosure may provide a communication system for controlling an unmanned system, the system comprising a communication link, a first two-way voice device connected to an onboard computing device, the onboard computing device having an interface to an onboard C3 system, wherein the first two-way voice device, the onboard computing device and the onboard C3 system are located on the unmanned system, and a second two-way voice device with a native interface for an operator to communicate with the unmanned system, wherein the onboard computing device queries the onboard C3 system about the status of the unmanned system and sends a formatted message to the second two-way voice device over the communication link and the second two-way voice device responds to the formatted message over the communication link. The first and second two-way voice devices may be selected from the group comprising: a point-to-point two-way radio, an infrastructure (trunked) two-way radio, and a mobile cellular telephone network device. The communication link may be selected from the group comprising: direct point-to-point radio, infrastructure (trunked) radio, and the mobile cellular telephone network. The formatted message may be comprised of at least one of the following: at least one piece of status data about the state of the unmanned system, at least one piece of data from a sensor, at least one question directed at the operator, and at least one menu of response options. The formatting of the formatted message comprises one or more of the following: prerecorded voice, text-to-speech synthesized voice, audio tones, and other formatting suitable for the native interface of the two-way voice device. The second two-way voice device may respond using one or more of the mechanisms selected from the group comprising: voice, pushbuttons, and facilities provided in the native interface. The first two-way voice device may receive a response from the second two-way voice device, transmit the response to the onboard computing device that analyzes the response and send instructions to the onboard C3 system. The instructions to the onboard C3 system may be to further query or transition the state of the unmanned system or the state of sensors or actuators in the unmanned system. The query and response cycle may repeat continuously or terminate based on mission objectives and the responses supplied by the operator.

Further embodiments of the present disclosure may provide a communication system for controlling an unmanned system, the system comprising: a digital packet based network link, a first networked device connected to an onboard computing device, the onboard computing device having an interface to an onboard C3 system, wherein the first networked device, the onboard computing device and the onboard C3 system are located on the unmanned system, and a second networked device with a native interface for an operator to communicate with the unmanned system, wherein the onboard computing device queries the onboard C3 system about the status of the unmanned system and sends a formatted message to the second networked device over the digital packet based network link and the second networked device responds to the formatted message over the digital packet based network link. The formatted message may be comprised of at least one of the following: at least one piece of status data about the state of the unmanned system, at least one piece of data from a sensor, at least one question directed at the operator, and at least one menu of response options. The formatting of the formatted message comprises one or more of the following: prerecorded voice, text-to-speech synthesized voice, audio tones, and other formatting suitable for the native interface of the networked device. The second networked device may respond using one or more of the mechanisms selected from the group comprising: voice, pushbuttons, and facilities provided in the native interface. The first networked device may receive a response from the second networked device, transmit the response to the onboard computing device that analyzes the response and send instructions to the onboard C3 system. The instructions to the onboard C3 system may be to further query or transition the state of the unmanned system or the state of sensors or actuators in the unmanned system.

BRIEF DESCRIPTION OF FIGURES

For a more complete understanding of this disclosure and its features, reference is now made to the following description, taken in conjunction with the accompanying drawings, in which.

Like references in the various drawings indicate like elements.

DETAILED DESCRIPTION

Personal communication devices (PCD) have become popular and ubiquitous. In some domains, such as military and public safety, virtually all personnel carry wireless two-way radios. In the broader public, telephones, whether wired, mobile or cellular, and Internet-capable smartphones, tablets, and mobile computing devices are also nearly universal. These personal communication devices have some interface by which the user interacts with them, which is called the PCD's native interface. A device's native interface may include output facilities including, but not limited to: audio output, lighted indicator displays, text-based displays, graphical displays, and haptic feedback. A device's native interface may include input facilities including, but not limited to: audio input, physical buttons or switches, touchscreen, virtual buttons or switches, optical camera, depth camera, infrared sensors, magnetic sensors, gyroscopic sensors, and gesture recognition. Furthermore, a personal communication device will have one or more communication link medium 5, which may include, but is not limited to, analog telephone service, point-to-point radio, trunked radio, mobile cellular network telephone service, Wi-Fi, GSM, CDMA, LTE, WiMAX, or other digital packet network link. The communication link medium may operate with zero or more security and/or authentication protocols, including, but not limited to Frequency-inversion scrambling, Key Exchange, RSA, SSL, IPSec, TLS, or Kerberos.

Figure 1:
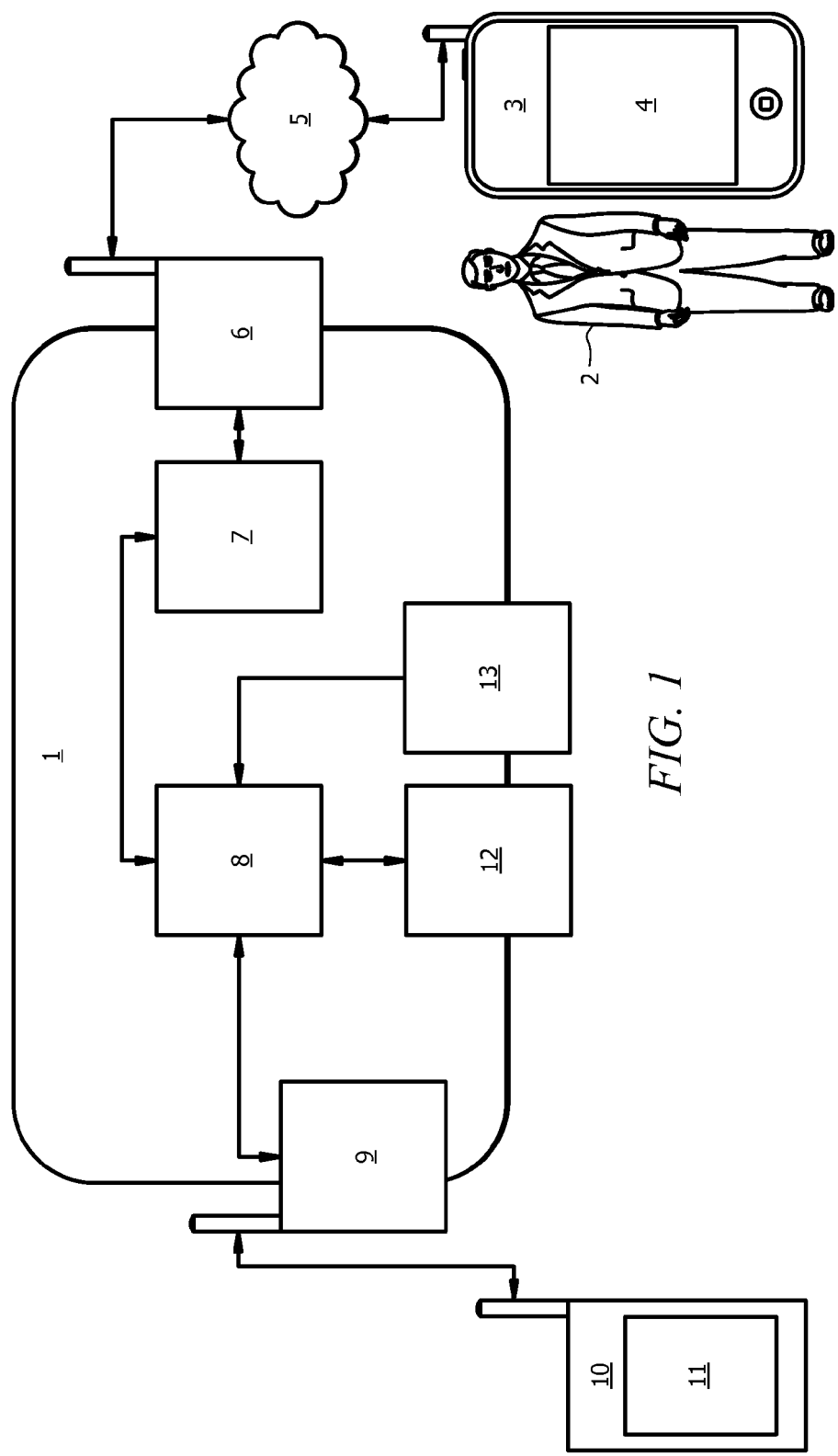
FIG. 1 illustrates an implementation of a Bi-Directional Communication System according to an embodiment of the present disclosure.
Figure 2:
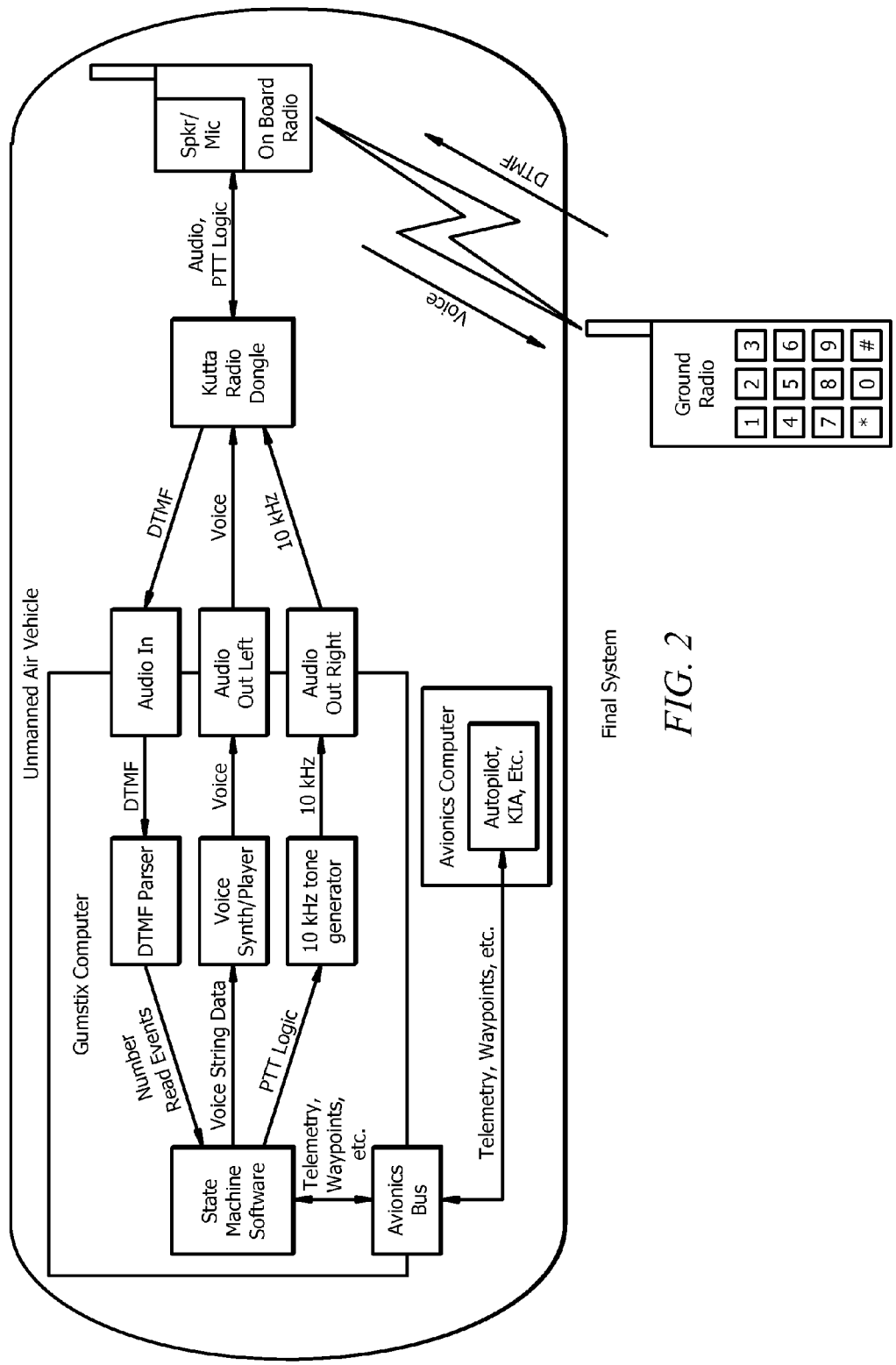
FIG. 2 illustrates an implementation of a Bi-Directional Communication System according to an embodiment of the present disclosure.

As depicted in FIG. 1, bi-directional communication systems and methods disclosed herein may enable operator 2 with personal communication device 3 and its native interface 4 to interface with unmanned systems 1 as a replacement or a supplement to the use of main communication interface 9 and rich, graphical interface 11 like that available on GCS or GDT 10. In some implementations, the bi-directional communication systems and methods disclosed herein may be integrated as a subsystem within a conventional GCS or GDT or similar airborne station.

In some implementations, a system for interacting with an unmanned system may comprise personal communication device 3 with native interface 4 for operator 2 to select command, control and/or communication (C3) messages by speaking voice commands or pushing buttons. In some implementations, the operator may be ground, sea, underwater, or air-based. It should be appreciated that such a system for interacting with an unmanned system may include hardware and/or software. Such a system may be virtual, physical, generated and/or operated through voice command without departing from the present disclosure. In some embodiments of the present disclosure, the native interface may be a physical keypad interface (e.g. a telephone keypad or similar button-like interface) or the communications device may be capable of generating, through a graphical interface, a keypad-like interface for the operator to make selections (e.g. screens or dial-pads on cellular telephones or display panels that can display or register button presses). In another embodiment of the present disclosure, there may be an overlay of augmented reality to interact with an unmanned system. In another embodiment of the present disclosure, there may be a gesture input interface with which to interact. A system for interacting with an unmanned system may take a variety of forms according to embodiments of the present disclosure as long as it allows the interaction to occur.

The system for interacting with an unmanned system may further comprise communication link 5 operable to send the messages selected by the operator via native interface 4 to unmanned system 1. It should be appreciated that the communication link may provide for communication through a variety of mechanisms including, but not limited to, audio, visual, point-to-point radio, trunked radio, mobile cellular network, and/or optical without departing from the present disclosure.

Unmanned systems may comprise main communication interface 9, which may link with GCS/GDT 10 by a communication channel for the purposes of C3 data transmission. The communication method disclosed herein may comprise onboard communication device 6, which is specifically compatible with communication link medium 5 of personal communication device 3. The onboard communication device may be a physically distinct device from the main communication interface, or it may be the same physical device employing a method to make it compatible with one or more of the personal communication device's communication link media. An onboard communication device operating in such a compatible way is called a compatible onboard communication device.

The unmanned system may comprise compatible onboard communication device 6 for receiving the messages sent via audio, digital message, Internet Protocol (IP) link, or other communications protocol or messaging format. Unmanned system 1 may further comprise onboard computing device 7 for processing and for responding to the messages received by the receiver. Onboard computing device 7 may relay command, control, and communication messages to C3 system 8 within unmanned system 1. The unmanned system may be operable to respond to the C3 messages by adjusting, reacting, changing, altering or maintaining its current status, position, task or other appropriate unmanned system activity via its access to onboard sensors 12 and actuators 13.

In some implementations, onboard computing device 7 may query unmanned C3 system 8 and optionally respond to operator 2 via communication link medium 5 through the use of pre-recorded voice messages, a text-to-speech engine, digital text for display, or similar method compatible with native interface 4 to convey status, acknowledge the operator, or provide other information that communicates back to the operator. Once the unmanned system responds to the messages selected by the operator, the process of sending and responding to messages may continue through the completion of the mission or task of the unmanned system.

Thus, the operator may use the native interface of a personal communication device to select messages, such as C3 messages, during all phases of operation of the unmanned system to interact with the unmanned system according to embodiments of the present disclosure. Such interactions may include, but are not limited to, determining status, prescribing desired actions, and changing the current mission or state of the unmanned system. Optionally, the unmanned system may responsively communicate status, location, or other operational or mission based information back to the operator, either through the same communications device used by the operator to communicate the C3 messages, or through another device that is capable of receiving communications or messages from the unmanned system.

The systems and methods of the present disclosure provide a natural, practical way of interacting with an unmanned system as compared to current systems, which rely on specialized hardware 10 and very complex, graphical methods 11 to help the operator communicate with unmanned system. The communication method disclosed herein can be applied in conjunction with existing equipment that a soldier or operator might already carry. For example, most soldiers have access to a radio with a keypad interface that may be used to control the frequencies or other radio based functions. This radio is typically the primary device used by the soldier to communicate to other soldiers or external elements. The communication system and method disclosed herein may allow an operator to command, control, and communicate with an unmanned system by using a series of key presses on an existing piece of technology, e.g. the keypad interface on a radio that he/she already has in his/her current equipment. The key presses of the operator may be used to send a message to the unmanned system that serves as the command, control or communication from the operator. The key presses of the operator may be translated or transmitted in any number of methods (DTMF, IP based, etc.) The keypad interface may comprise physical buttons or graphical user interface on a Smartphone may display a virtual keypad with virtual buttons or the equivalent. In some embodiments of the present disclosure, messages may be sent via voice commands.

The unmanned system receives and uses the C3 messages from the operator as input to its mission. In response, the unmanned system may simply provide a status or it may take a more complex action, such as changing its route or changing its task. The unmanned system is operable to respond intelligently using pre-recorded voice messages, text-to-speech engines, or a similar method to appropriately acknowledge and communicate information back to the relevant operator or user of the unmanned system. In various implementations, the unmanned system may send a series of alphanumeric information to the operator (e.g. Latitude, Longitude, Altitude, Military Grid Reference Coordinates (MGRS)) to communicate geospatial information, status, or intention of the unmanned system (e.g. look here, land here, returning to base) and vice versa (i.e. the operator may send the same messages to the unmanned system). Although several embodiments have been described wherein the unmanned system provides a response to an operator, it should be appreciated that the unmanned system does not have to provide an actual response.

While some embodiments of the present disclosure have been described in a military context, it should be appreciated that embodiments of the present disclosure may be used in a variety of civilian (or non-military) contexts as well. In an embodiment of the present disclosure, first responders, such as fire or police personnel, may carry radios to communicate with other first responders. An unmanned system may be used to deliver supplies to first responders, and first responders may communicate with the unmanned system, for example, to identify a location for the unmanned system to land to deliver the supplies. In other embodiments of the present disclosure, an unmanned system may be used for delivery of other goods and/or services, including but not limited to, food, packages, and prescriptions, and systems and methods according to embodiments of the present disclosure may be used to interact with the unmanned system making such deliveries. In other embodiments of the present disclosure, an unmanned system may be used to control and/or query onboard sensors and/or actuators.

Example Systems and Methods

Embodiments of the present disclosure have been reduced to practice in at least one form. The concept developed for Autonomous Casualty Evacuation (CASEVAC) is called Dial-a-Drone ("DAD"). The purpose of Dial-a-Drone is to leverage two existing technologies: unmanned systems and standard issue radios. By coupling these technologies, a product may be developed more quickly and at a lower cost to the military. The only equipment needed for this system are a vehicular radio system (in this case, an ANNRC-110) coupled with a personal radio system (in this case, an AN/PRC 152 radio).

I. Integration and Testing

The DAD system allows for an unmanned aerial vehicle (UAV), which may also be referred to as an unmanned aerial system (UAS), to be controlled from the ground via DTMF tones on a handheld radio. However, the control available to ground personnel is limited and mission specific. DAD has been developed for use in CASEVAC missions where ground personnel only have the availability of a military handheld radio and an autonomous UAS. The system may allow ground personnel to listen for voice prompts from the air, and respond by pushing numbers on the radio keypad to send a DTMF tone to the UAV.

The system shown in FIG. 1 allows for medical supplies or evacuation vehicles to be directed to a landing zone (LZ) by a person on the ground using no additional equipment. Equipment will be added to the current AV platform to support interaction with the ground radio. The ground radio is based on the PRC-152A already deployed to units for use in the field. However, the use of conventional DTMF tones allows for the system to use multiple radio platforms. Each radio system used may be profiled to ensure the DTMF frequency range falls within the standard frequency listed for DTMF tones.

Figure 3:
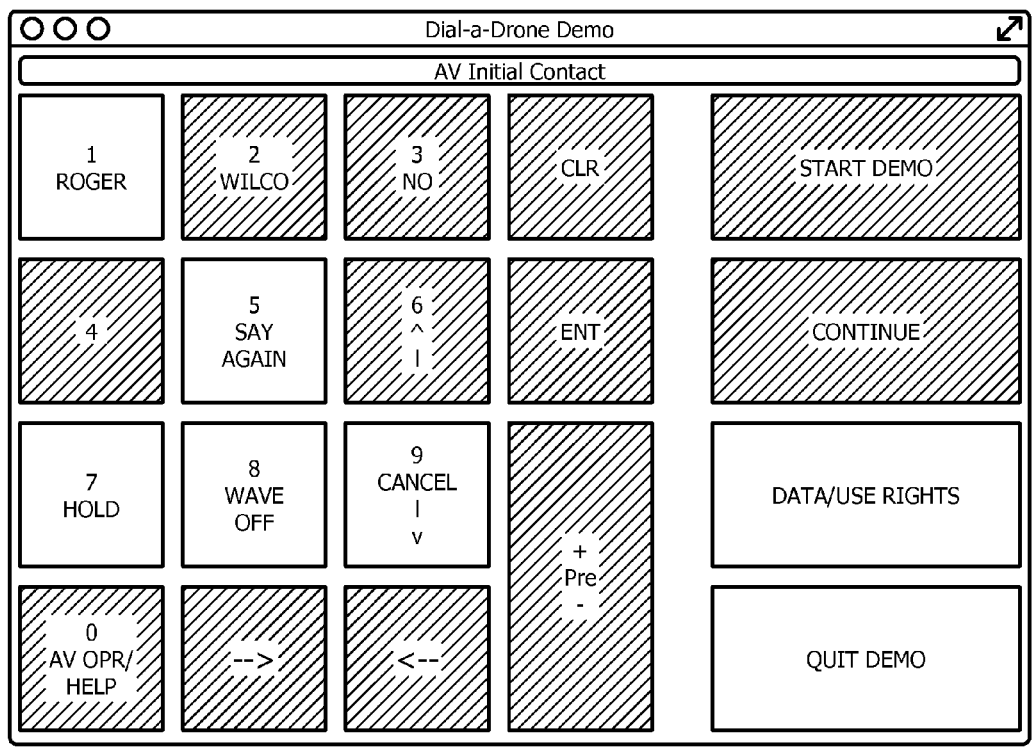
FIG. 3 illustrates an implementation of a GUI according to an embodiment of the present disclosure.

A prototype DAD System was developed for a proof-of-concept demonstration. The main DAD software runs on a Mac Mini, running Mac OS X, with a GUI as shown in FIG. 3, and the avionics system runs on a Windows machine. The personal ground radio sends DTMF tones to the onboard radio, which will include Kutta's Radio Dongle technology, to interface with the DAD software.

II. Software

The DAD System consists of five major software components. When integrated together, these components form the basis of the DAD system with the addition of radio hardware and an AV. Some software components are specifically related to "uplink" or "downlink" roles.

Uplink

A. DTMF Parser

The DTMF Parser's main function is to parse input audio for DTMF when the system is triggered. The DTMF Parser detects events defined to send appropriate messages out. The DTMF Parser works in conjunction with the Kutta Radio Dongle to input the DTMF tones from the "on board" radio. The detected DTMF may then be sent to the state machine to transition the vehicle state. Each key press, and associated DTMF tone, triggers a pre-determined event, shown in FIG. 3.

The designation of each key is based upon valid procedural words (PROWORDS) consistent with those radio procedures soldiers in the field would be familiar with Table 1 describes the meaning of each PROWORD and command used in the DAD System. The PROWORDS are taken from Army Field Manual (FM) 6-02.53: Tactical Radio Operations.

TABLE 1

| Command Definition | |
|---|---|
| PROWORD/Command | Meaning |
| AV Operator | Calls the AV operator if a communication link is available. If not, the help system will initiate. |
| Cancel | Command will either cancel the last command sent to the AV or terminate the hold or return to base (RTB) procedure. |
| Hold | Send the AV to the pre-determined hold position. |
| No | Used in lieu of negative. The FU cannot satisfy the request of the AV. |
| ROGER | I have received your last transmission satisfactorily. |
| SAY AGAIN | Repeat all of your last transmission. |
| Wave Off | AV to RTB. |
| WILCO | I have received your signal, understand it and will comply. (Meaning of ROGER is included in that of WILCO). |

The AV Operator event can be selected at any time during the mission. Once contact has either been made with the AV Operator or the help system has completed, the mission will return to the last transmission received. If no key press is registered by the system after a configurable amount of time, the system will repeat the last transmission. If the system has performed this function three times (with no response from the FU), it will either enter a one-way communication mode for the Status Report Procedure or the RTB mode for the Notification Point (NP) Procedure.

Downlink

Transmitting audio to the ground may be performed using the stereo audio interface of an on-board DAD computer. One channel, for example, the left channel, carries the audio such as recorded or generated speech, and the other channel, the right, carries a logical push-to-talk proxy signal: as a switchable constant tone, in this case 10 kHz. In other circumstances where other outputs are available such as direct general-purpose input/output (GPIO) or other numbers of audio outputs besides two-channel stereo, any other suitable logic signal or proxy logic signal could be used.

B. Text-To-Speech (TTS) Player

The TTS Player's main function is to execute text-to-speech. The state machine may be programmed to "speak" as a pilot would to ground personnel. The TTS Player was developed to add flexibility to the system by using inputted text string to create the speech heard, rather than pre-defined audio files. This flexibility allows the user to easily change the messages to the user, add more functionality (a/k/a vehicle states), vehicle tail number, and ground personnel call sign. The TTS audio is sent to the Kutta Radio Dongle through one audio channel simultaneously with a 10 kHz tone in the other channel. The TTS is then transmitted to the ground radio when the dongle interface device interprets the 10 kHz tone as a proxy logic signal for push-to-talk (PTT). In other embodiments, other signals could be used to convey PTT logic.

C. 10 kHz Tone Generator

The 10 kHz Tone Generator's main function is to emit a 10 kHz audio tone when commanded to start and stop. The 10 kHz tone is needed to actuate the radio's Push-To-Talk (PTT) hardware via the dongle interface instead of direct logic from the computer. This allows the greatest flexibility in interfacing with a diverse selection of on-board radio transmitters. The Kutta Radio Dongle is already built and tested to work with at least three different manufacturers and at least five unique radio models using this control mechanism. When the state machine enters a state where there is a TTS output, the 10 kHz audio tone starts. When the TTS audio string has finished, the 10 kHz audio tone stops.

D. State Machine

The state machine takes the DTMF Parser and AV Sim inputs, using position triggers or DTMF tones, the state machine transitions. These transitions are implemented through a TTS and 10 kHz output to the "on board" radio. The state machine is defined by a set of use cases developed from research of current CASEVAC operations conducted by Kutta.

Figure 4:
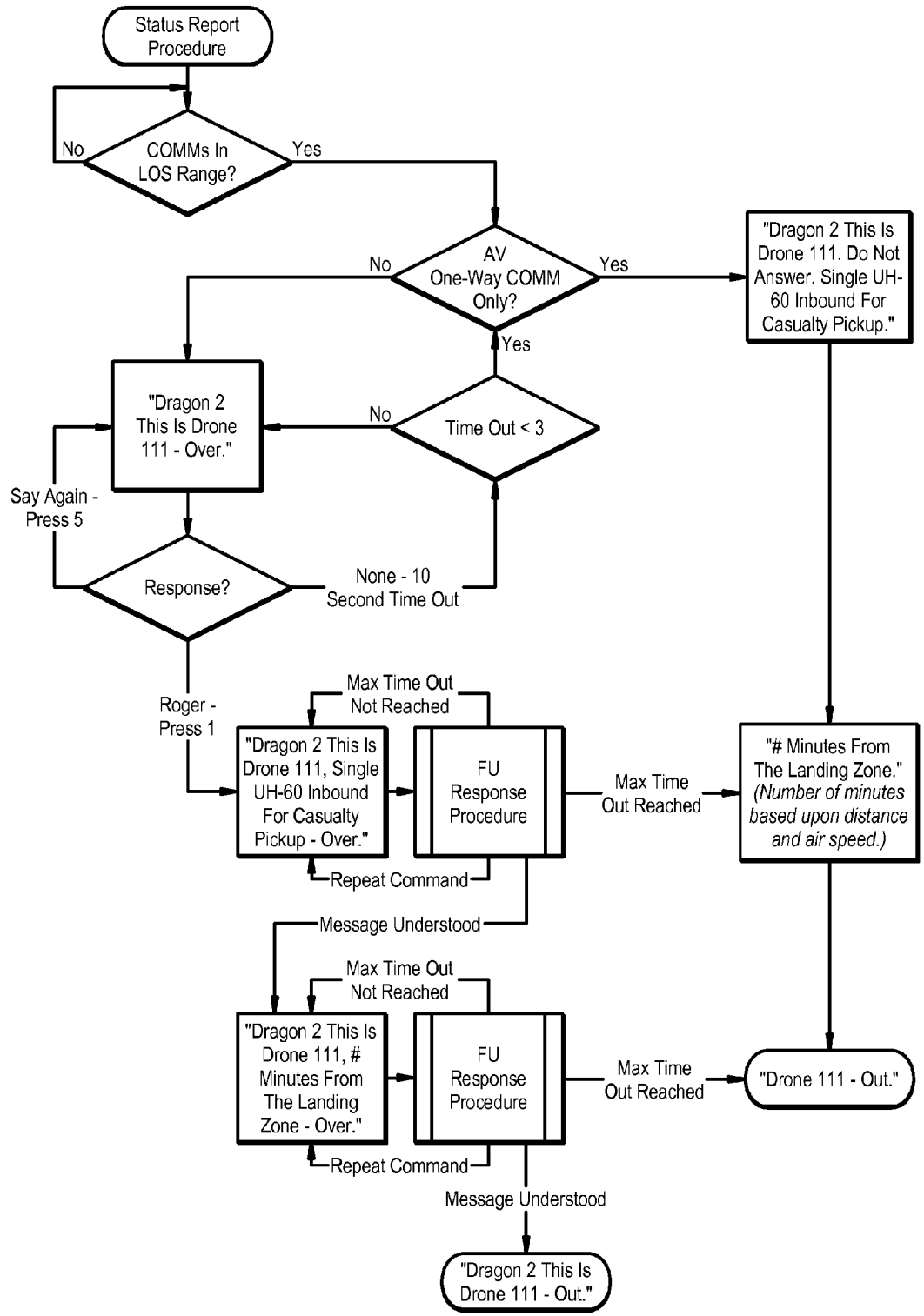
FIG. 4 illustrates an implementation of a Status Report Procedure according to an embodiment of the present disclosure.

The first communication the FU will receive from the UAS is a Status Report. The Status Report Procedure initiates when the UAS determines it should be in Line-of-Sight (LOS) communication range with the FU. The AV will have a more powerful radio system onboard, thus, a one-way communication link might be established instead of a two-way communication link. Regardless what communication link may be utilized, the AV will send a Status Report, shown in FIG. 4, with its type (UH-60), intention (casualty pickup), and estimated time to the LZ based upon distance and speed. If a one-way communication link is established, the AV will send the Status Report under the assumption it will not receive confirmation. Thus, the "do not answer" PROWORD is used. When a two-way communication link is established, the AV expects a response from the FU, either: "roger", "say again", "hold", or "wave-off". If the max time out has occurred, the AV will transition to the one-way communication procedure.

Figure 5:
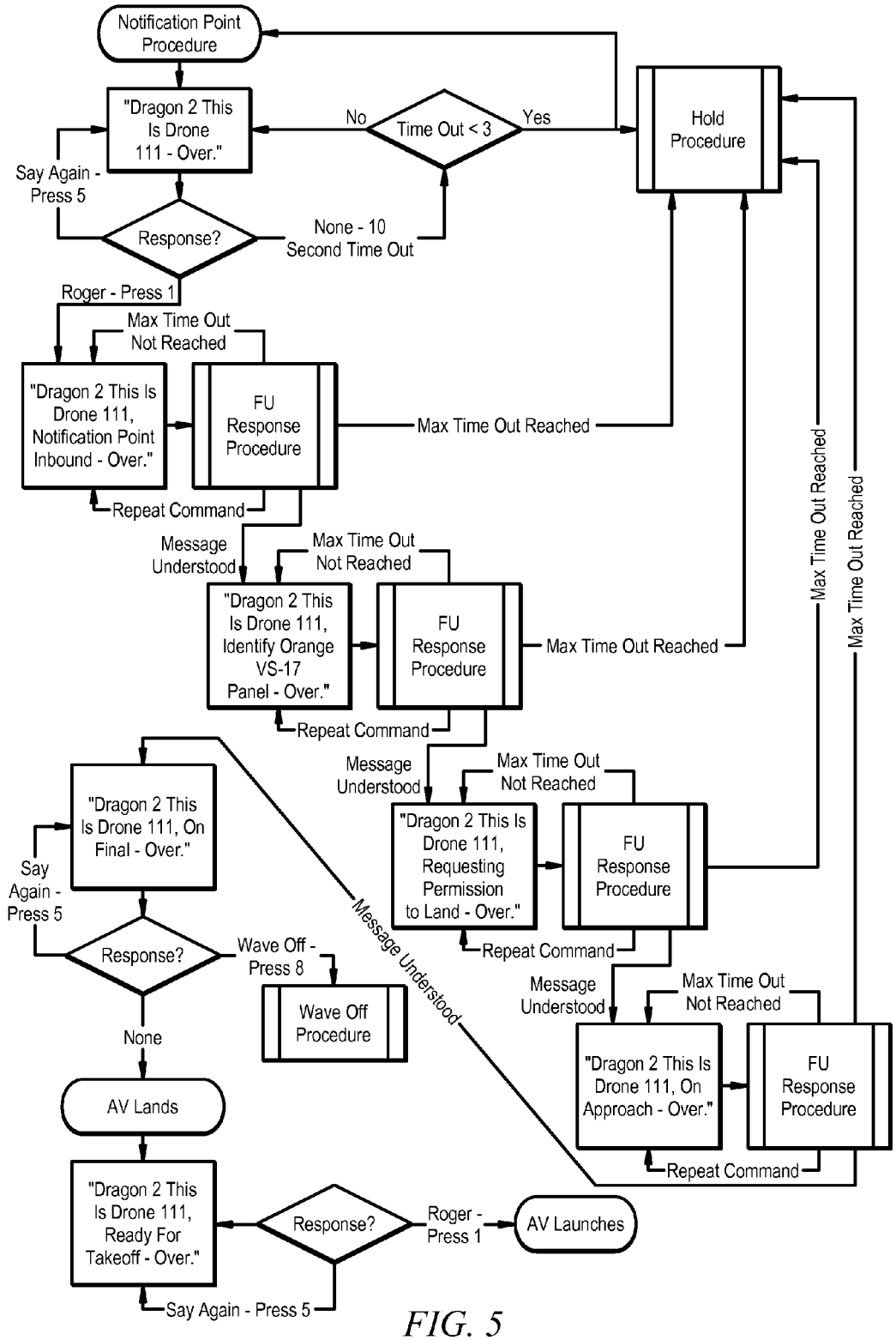
FIG. 5 illustrates an implementation of a Notification Point (NP) Procedure according to an embodiment of the present disclosure.
Figure 6:
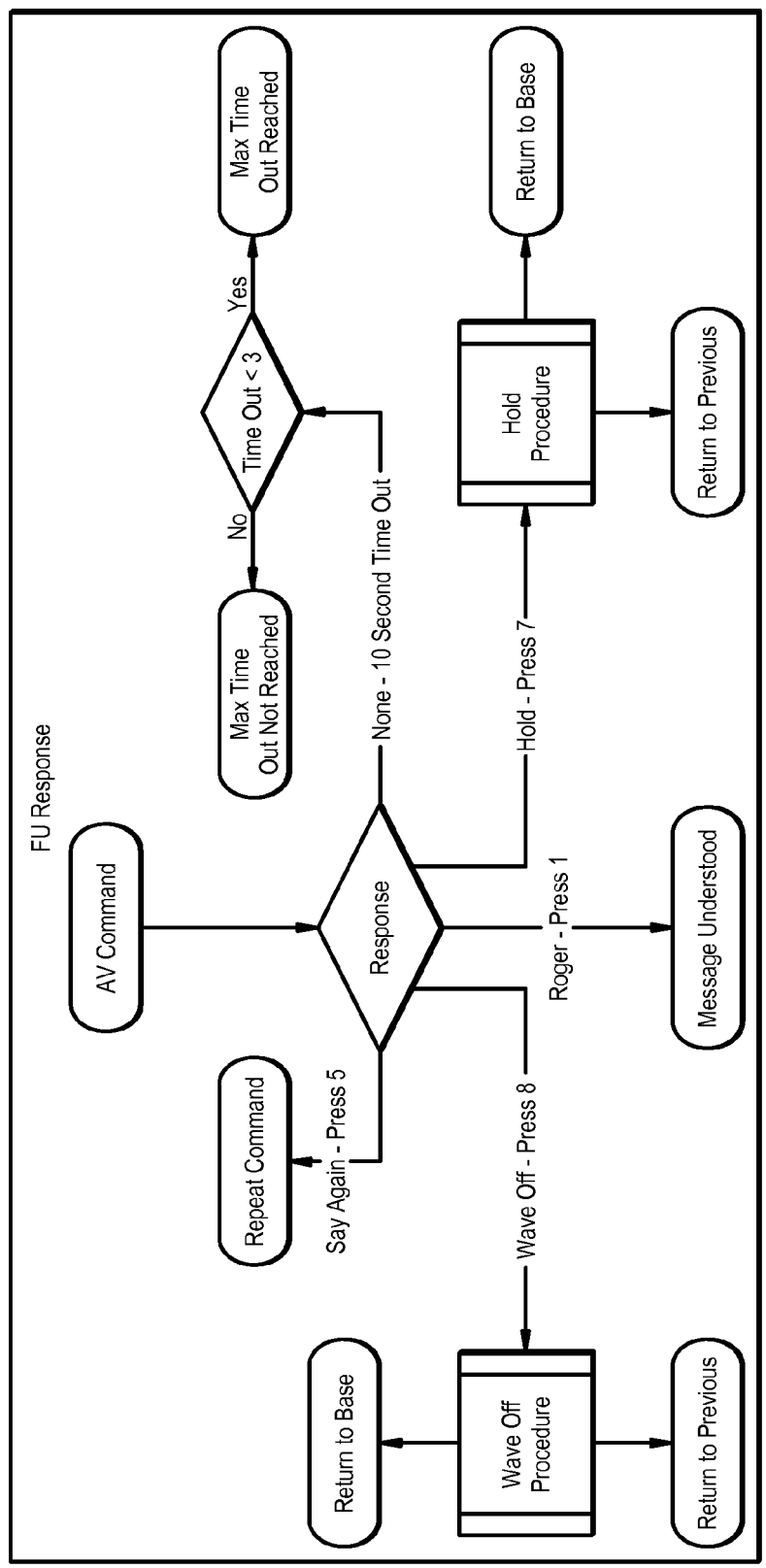
FIG. 6 illustrates an implementation of a field unit (FU) Response Procedure according to an embodiment of the present disclosure.
Figure 7:
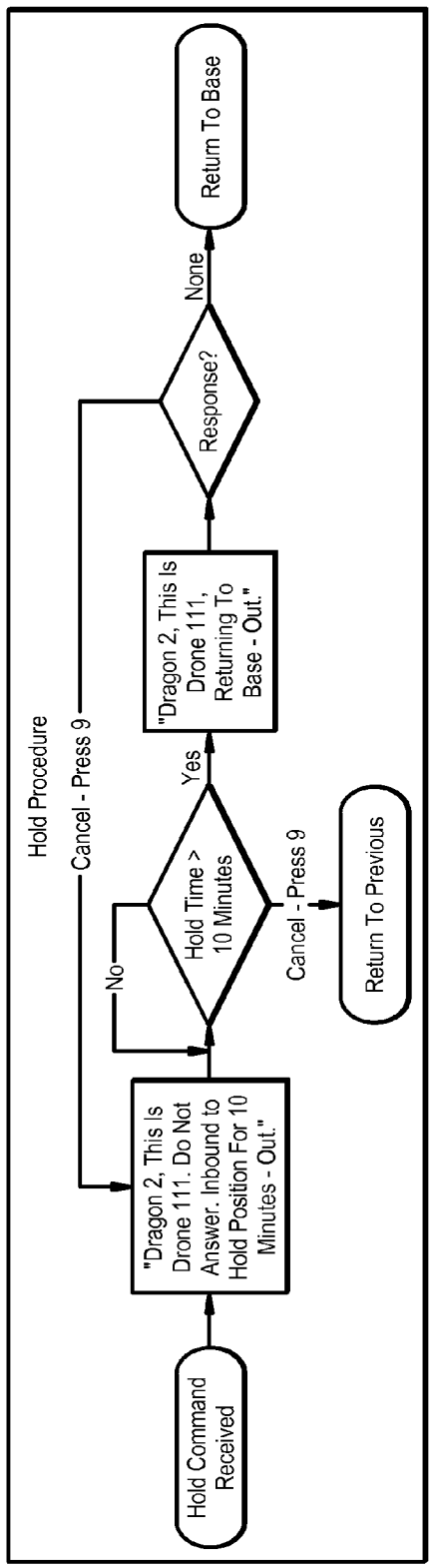
FIG. 7 illustrates an implementation of a Hold Procedure according to an embodiment of the present disclosure.

Communication is re-established between the FU and AV when the AV reaches the NP, shown in FIG. 5. During the NP Procedure, the AV will await a response from the FU, shown in FIG. 6. The AV will respond to four commands ("roger", "say again", "hold", or "wave off") or the time out procedure. The max time out procedure utilized in the Status Report Procedure is slightly modified for the NP Procedure. When the max time out has been reached, the AV will inform the user it is entering into the Hold Procedure, shown in FIG. 7.

The Hold Procedure initiates from either the max time out being reached or a hold command received from the FU. The AV will move to a pre-determined hold position for a per-determined amount of time. During this time, the FU can exit from the Hold Procedure by pressing the cancel button. The AV will return to the last transmission in the NP Procedure. If the hold time exceeds the pre-determined time, the AV will radio to the FU that it is entering into a RTB Procedure. The FU is able to cancel the RTB Procedure by selecting the cancel button, where the AV will then return to the hold position. If the FU does not select the cancel button in time, the FU must contact the AV Operator (either directly or through aviation channels) to turn the AV back.

The AV will verify the type of signaling method employed by the FU, as indicated in the initial 9 Line MEDEVAC request. Once the AV has verified the location of the signaling method, through a scanning procedure, it will require permission to land. Once the AV is within a pre-determined distance from the LZ, it will announce it is on approach. This is the last time the FU can initiate a hold command. The last transmission from the AV, prior to landing, is an "on final" transmission. During this time, the FU can only ask the AV to repeat its transmission or wave off the landing.

Figure 8:
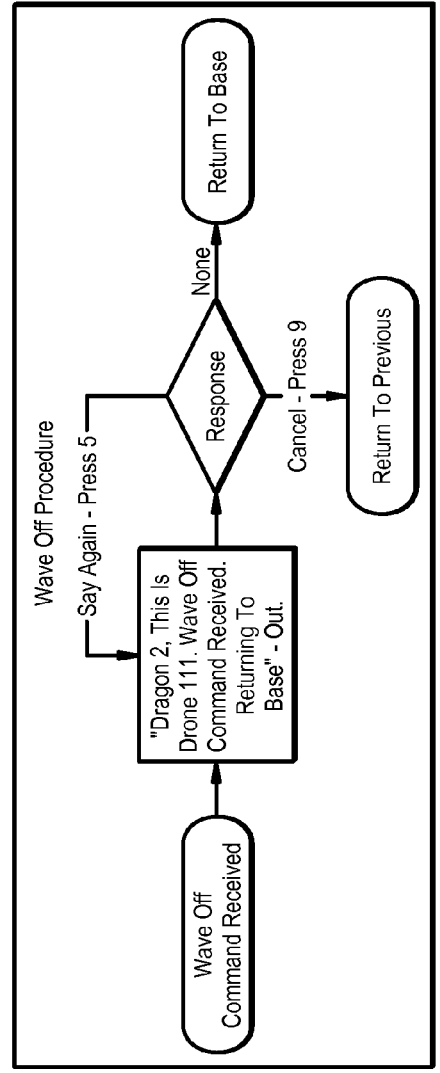
FIG. 8 illustrates an implementation of a Wave Off Procedure according to an embodiment of the present disclosure.

The Wave Off Procedure shown in FIG. 8 is only entered when the wave off button is selected. The AV will inform the FU that the command has been received and will initiate the RTB Procedure. The Wave Off Procedure can be canceled by the FU. If the FU does not select the cancel button in time, the FU must contact the AV Operator (either directly or through aviation channels) to command the AV back to the mission plan.

The ground personnel may unload and load the AV as needed. The AV will inform the FU when it is ready to takeoff. There is no time out for this transmission since it is dependent on how long it takes to unload and load the AV. Once the FU is ready to launch the AV, they will select roger. After a pre-determined delay, the AV will launch and fly to the pre-determined MTF.

End of Examples

Various processes have been described, which may be implemented by various systems. Various operations in the procedures may be added, deleted, and/or modified. In some implementations, a procedure may be performed in combination with other procedures and/or systems. Instructions for one or more of the operations of a procedure may be stored in a memory of the system. The instructions may be retrieved from the memory and executed by a processor of the system.

Although users have been described as a human, a user may be a person, a group of people, a person or persons interacting with one or more computers, and/or a computer system.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

In various implementations, a computer may include one or more processors that executes instructions and manipulates data to perform operations of the controller and a memory. The processor may include a programmable logic device, a microprocessor, or any other appropriate device for manipulating information in a logical manner. A memory may include any appropriate memory including a variety of repositories, such as, SQL databases, relational databases, object oriented databases, distributed databases, XML databases, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/o rphase-change memory (PRAM).

In various implementations, the memory may include data with specific instructions and/or numbers of instructions, user information, etc. In addition, various types of software may be stored on the memory. For example, instructions (e.g., operating systems, control software, and/or other types of software) and one or more operating modules (e.g., instructions to perform operations when executed by a processor of the system) may be stored on the memory of the computer (e.g., user device, controller). The operation module may perform various described processes. The operation module may generate one or more GUIs based on the described processes.

A communication interface may allow the computer to communicate with components and/or other computer systems. The communication interface may transmit data from the computer and/or receive data from other components, other repositories, and/or other computer systems via network protocols (e.g., TCP/IP, Bluetooth, and/or Wi-Fi) and/or a bus (e.g., serial, parallel, USB, and/or FireWire).

The computer may include a presentation interface to present data to a user, such as though a monitor and speakers. The presentation interface may facilitate receipt of input for operation from users and/or present various GUIs to the user.

The computer may include a server, as well as a server pool. For example, the computer may include a general-purpose personal computer (PC) a Macintosh, a workstation, a UNIX-based computer, a server computer, or any other suitable device. According to one implementation, a computer may include a web server. The computer may be adapted to execute any operating system including UNIX, Linux, Windows, or any other suitable operating system. The computer may include software and/or hardware in any combination suitable to provide access to data and/or translate data to an appropriate compatible format.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a track pad) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "an instruction" includes a combination of two or more instructions and reference to "a camera" includes different types and/or combinations of cameras. Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A communication system for interacting with an unmanned system comprising: a personal communication device with a native interface for an operator to select command, control and/or communication (C3) messages to interact with the unmanned system, the C3 messages selected from the group comprising: determine status of the unmanned system, prescribe desired actions for the unmanned system, change the current mission of the unmanned system, and change the state of the unmanned system; and a communication link operable to send the C3 messages selected by the operator to the unmanned system, wherein the unmanned system includes a compatible communication device that receives the C3 messages over the communication link and a processor that processes and responds to the C3 messages received by the receiver, and wherein the unmanned system responds to the C3 messages by adjusting, reacting, changing, altering or maintaining its current status, location, position, task or other unmanned system activity.

2. The communication system of claim 1 wherein the operator is ground-based.

3. The communication system of claim 1 wherein the operator is sea-based.

4. The communication system of claim 1 wherein the operator is underwater-based.

5. The communication system of claim 1 wherein the operator is air-based.

6. The communication system of claim 1 wherein the native interface is selected from the group comprising:
    a virtual interface, a physical interface, a generated interface, an augmented reality interface, a voice controlled interface, and combinations thereof.

7. The communication system of claim 1 wherein the communication link is selected from the group comprising:
    audio, visual, point-to-point radio, infrastructure radio, a cellular network, optical, DTMF tone, digital message, Wi-Fi, CDMA, GSM, LTE, WiMAX, Internet Protocol (IP) link, other digital packet network link, microwave, and combinations thereof.

8. The communication system of claim 1 wherein the unmanned system responds to the operator through use of pre-recorded voice messages.

9. The communication system of claim 1 wherein the unmanned system responds to the operator through use of a text-to-speech engine.

10. The communication system of claim 1 wherein the unmanned system responds to the operator through the use of digital text.

11. The communication system of claim 1 wherein the unmanned system responds to the operator through the use of other digital information formatted for the native interface of the personal communication device.

12. The communication system of claim 1 wherein the communication system is a supplement to a ground control station or ground data terminal.

13. The communication system of claim 1 wherein the communication system replaces a ground control station or ground data terminal.

14. The communication system of claim 1 wherein the communication system is integrated as a subsystem within a ground control station or ground data terminal.

15. A communication system for controlling an unmanned system, the system comprising: a communication link; a first two-way voice device connected to an onboard computing device, the onboard computing device having an interface to an onboard C3 system, wherein the first two-way voice device, the onboard computing device and the onboard C3 system are located on the unmanned system; and a second two-way voice device with a native interface for an operator to communicate with the unmanned system, wherein the onboard computing device queries the onboard C3 system about the status of the unmanned system and sends a formatted message to the second two-way voice device over the communication link and the second two-way voice device responds to the formatted message over the communication link, and wherein the first two-way voice device receives a response from the second two-way voice device, transmits the response to the onboard computing device that analyzes the response and sends instructions to the onboard C3 system.

16. The communication system of claim 15 wherein the first and second two-way voice devices are selected from the group comprising:
    a point-to-point two-way radio, an infrastructure (trunked) two-way radio, and a mobile cellular telephone network device.

17. The communication system of claim 15 wherein the communication link is selected from the group comprising:
    direct point-to-point radio, infrastructure (trunked) radio, and the mobile cellular telephone network.

18. The communication system of claim 15 wherein the formatted message is comprised of at least one of the following:
    at least one piece of status data about the state of the unmanned system, at least one piece of data from a sensor, at least one question directed at the operator, and at least one menu of response options.

19. The communication system of claim 15 wherein the formatting of the formatted message comprises one or more of the following:
    prerecorded voice, text-to-speech synthesized voice, audio tones, and other formatting suitable for the native interface of the two-way voice device.

20. The communication system of claim 16 wherein the second two-way voice device responds using one or more of the mechanisms selected from the group comprising:
    voice, pushbuttons, and facilities provided in the native interface.

21. The communication system of claim 15 wherein the instructions to the onboard C3 system are to further query or transition the state of the unmanned system or the state of sensors or actuators in the unmanned system.

22. A communication system for controlling an unmanned system, the system comprising: a digital packet based network link; a first networked device connected to an onboard computing device, the onboard computing device having an interface to an onboard C3 system, wherein the first networked device, the onboard computing device and the onboard C3 system are located on the unmanned system; and a second networked device with a native interface for an operator to communicate with the unmanned system, wherein the onboard computing device queries the onboard C3 system about the status of the unmanned system and sends a formatted message to the second networked device over the digital packet based network link and the second networked device responds to the formatted message over the digital packet based network link, and wherein the first networked device receives a response from the second networked device, transmits the response to the onboard computing device that analyzes the response and sends instructions to the onboard C3 system.

23. The communication system of claim 22 wherein the formatted message is comprised of at least one of the following:
   at least one piece of status data about the state of the unmanned system, at least one piece of data from a sensor, at least one question directed at the operator, and at least one menu of response options.

24. The communication system of claim 22 wherein the formatting of the formatted message comprises one or more of the following:
   prerecorded voice, text-to-speech synthesized voice, audio tones, and other formatting suitable for the native interface of the networked device.

25. The communication system of claim 22 wherein the second networked device responds using one or more of the mechanisms selected from the group comprising:
   voice, pushbuttons, and facilities provided in the native interface.

26. The communication system of claim 22 wherein the instructions to the onboard C3 system are to further query or transition the state of the unmanned system or the state of sensors or actuators in the unmanned system.

* * * * *